Patented Oct. 12, 1954

2,691,601

UNITED STATES PATENT OFFICE 2,691,601

PHOSPHOR TREATMENT

Keith H. Butler, Marblehead, and Horace H. Homer, Arlington, Mass., assignors to Sylvania Electric Products Inc., Salem, Mass., a corporation of Massachusetts No Drawing. Application March 10, 1950,
Serial No. 149,028

5 Claims. (Cl. 117—33.5)

This invention relates to phosphate phosphors, especially those using oxidizable activators such as manganese, and particularly to the halophosphate phosphors.

Objects of the invention are to increase the brightness and lumen maintenance of such phosphors, and to increase their adherence to the glass of a lamp envelope.

A feature of the invention is a chemical treatment of the phosphor after firing.

Another feature is a correlation of said treatment with the type of dispersing agent used in suspending the phosphor for coating the lamp envelope.

Still another feature is a phosphor powder freer from impurities on the surfaces of its particles.

Other features, objects and advantages of the invention will be apparent from the following specification.

In preparing a phosphor according to our invention, we may, for example, mix di-basic calcium phosphate, manganous carbonate, antimony tetraoxide, ammonium chloride, calcium fluoride and calcium carbonate and fire the mixture in an inert atmosphere as in said application, in the proportions to give 4.71 gram-atoms calcium, 0.13 gram-atom manganese, 0.13 gram-atom antimony, 0.81 gram-atom of fluoride, and 0.27 gram-atom chlorine, for each 3.00 moles of the phosphate radical, but suitable phosphors made by other methods and from other starting materials may be used in following the invention.

After firing, the powdered phosphor is washed in an acidic or basic solution, preferably in aqueous solutions of hydrochloric acid or ammonium hydroxide. Other acids or bases may be used, but those which are oxidizing agents, like nitric acid, should be avoided.

The phosphor may be suspended in water, treated with the acid or base, rinsed by decantation, adjusted to a desired pH value, filtered and dried.

The treatment will increase the phosphor's brightness under ultraviolet excitation in the region of 2500 Angstroms, as shown by the following test results:

| Treatment | Brightness | |
|---|---|---|
| | Before | After |
| Acid | 103.5 | 110 |
| Base | 103.5 | 106 |

Either treatment will improve the brightness, but the acid is more effective than the base. The weight of phosphor required to coat a bulb satisfactorily is decreased by my process, the powder weight being as follows for a "20 watt" tube, that is a tube 24 inches long and 1½ inches in diameter:

| | Grams |
|---|---|
| Without treatment | 2.15 |
| With treatment | 1.80 |

While an improvement in brightness and lumen maintenance is effected by treatment with either an acid or a base, the acid being best, we have found that the choice of acid or base has an important relationship to the dispersion of the powder in the eventual coating suspension and hence to the powder weight required for coating a bulb.

The relationship between the final pH of the final rinsing solution and the type of dispersing agent used in the coating suspension is shown by the following table:

40 WATT

| pH of Solution | Type of Dispering Agent | Powder Wt., gm. |
|---|---|---|
| 8 pH | Acid | 4.2 |
| 6 pH | do | 5.0 |

20 WATT

| pH of Solution | Type of Dispering Agent | Powder Wt., gm. |
|---|---|---|
| 8 pH | Base | 2.15 |
| 6 pH | do | 2.0 |

The values with the acid dispersing agent were for coating "40 watt" tubes, that is tubes 1½ inches in diameter and 48 inches long, while the values with the basic dispersing agent were obtained with a "20 watt" tube, that is a tube of the same diameter but only half as long. The choice of tubes was merely a matter of convenience.

The 40-watt table shows that if an acid dispersing agent, for example oleic acid or other fatty acid, is used along with the ethyl cellulose and xylol solution, the powder treatment should be finished to a pH above 7. By contrast, the 20 watt data shows that if an alkaline dispersing agent, for example an amine of a long-chain fatty acid, is to be used, the powder treatment should be finished to a pH below 7.

Thus to obtain the maximum benefit of our process with acid dispersing agents, the powder may first be treated with a dilute mineral acid, then washed with water by decantation to a pH between 6 and 7, and the final pH of the final rinsing solution adjusted with ammonia or other base, to about 8 pH before drying.

If the basic dispersing agent is to be used in the coating suspension, we may for example suspend 2000 g. of phosphor powder in about 4000 cc. of water, 20 cc. of 12 N hydrochloric acid being then added and the solution agitated for about half an hour. The suspension may then be allowed to settle and the effluent liquor decanted. The powder may then be agitated at 15 minute intervals with 4000 cc. of water and decanted until the pH of the effluent solution is about 6. The suspension may then be filtered and dried at 250° F. for about 8 hours.

The powder is then ready for use in a coating solution with a basic dispersing agent. If an acidic dispersing agent is to be used, 20 cc. of concentrated ammonium hydroxide may be added when the solution is at the 6 pH point, and the solution then filtered and dried as above. The quantity of acid used is not critical, and the amount for best results may vary somewhat with the quantity of the phosphor powder.

We believe that the phosphor particles on removal from the furnace have a very thin surface layer which fluoresces less brightly than the rest of the crystal. Calcium halophosphate is only very slightly soluble in water, but is somewhat more soluble in alkaline solutions and very readily soluble in acid solutions, which is probably the reason for the greatest effectiveness of the acid treatment. The inert material dissolved by the treatment should be removed by washing by decantation to prevent its reprecipitation on the phosphor during drying.

Since the acidic treatment is superior to the basic treatment for brightness, we prefer to use an initial acid treatment and then, if the phosphor is to be used with an acid dispersing agent, to add ammonia to the final rinsing solution, as described above. However, considerable gain in brightness may be achieved with treatment only by a base, as shown by the earlier table and the following:

| Treatment | Percent of Initial L. P. W. at 500 Hours |
|---|---|
| None | 83.8 |
| NH$_4$OH | 88.0 |

The expression "L. P. W." means lumens per watt, the watts referred to being watts input to the final fluorescent lamp using the coating. Such lamps usually have oxide-coated tungsten wire electrodes at each end, as shown, for example, in U. S. Patent 2,258,158, issued October 7, 1941, to Erwin F. Lowry and a filling of argon gas at a few millimeters of mercury pressure and mercury vapor at a few microns pressure.

A suspending medium of xylol and ethyl cellulose has been described by way of example, but not by way of limitation, as other media well-known in the art may be used, for example, butyl acetate and nitrocellulose, amyl acetate and nitrocellulose, or other well-known laquers. The components of the suspending media, and their proportions and the amount of phosphor added may be varied in the manner well-known in the art to give the desired coating density or light transmission.

What we claim is:

1. The method of treating a calcium halophosphate activated by manganese and antimony phosphor to increase its luminescent brightness, which comprises washing in an aqueous solution of hydrochloric acid, rinsing in water, and then bringing the solution to a pH of 8 by adding a basic reagent capable of leaving no residue on subsequent heat treatment.

2. The method of claim 1, and the further steps of drying the phosphor, suspending it in a liquid including an acidic dispersing agent, and applying the phosphor to the interior of a fluorescent lamp envelope.

3. The method of treating a calcium halophosphate phosphor to increase its brightness, which comprises washing the phosphor in an aqueous solution of a mineral acid rinsing to a pH of about 6.

4. The method of treating a calcium halophosphate phosphor to increase its luminescent brightness, which comprises washing said phosphor in a non-oxidizing aqueous solution of a mineral acid capable of leaving no residue on subsequent heating, rinsing said phosphor, and then bringing the solution to a pH of about 8 by adding a non-oxidizing basic reagent capable of leaving no residue on subsequent heat treatment.

5. The method of increasing the luminescent brightness of a powdered calcium halophosphate phosphor activated by manganese and antimony, and said method comprising: washing the powder particles in an aqueous solution of a mineral acid for a time only sufficient to dissolve the poorly luminescent layer of calcium halophosphate on the surfaces of the particles and then rinsing the powder in water, said acid being capable of leaving no residue on subsequent heat treatment, and then bringing the solution to a pH above 7 by adding a basic reagent capable of leaving no residue on subsequent heat treatment.

References Cited in the file of this patent

UNITED STATES PATENTS

| Number | Name | Date |
|---|---|---|
| 2,108,683 | Leverenz | Feb. 15, 1938 |
| 2,298,968 | Roberts et al. | Oct. 13, 1942 |
| 2,408,621 | Frolich | Oct. 1, 1946 |
| 2,488,733 | McKeag | Nov. 22, 1949 |
| 2,523,026 | Jones | Sept. 19, 1950 |